A. PALMER.
Seed-Dropper.
No. 7,642
Patented Sept. 10, 1850.
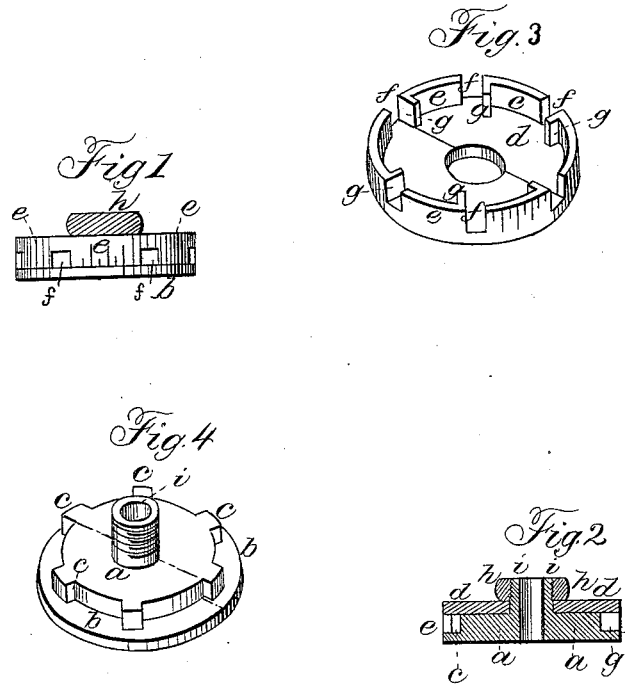

UNITED STATES PATENT OFFICE.

AARON PALMER, OF BROCKPORT, NEW YORK.

IMPROVEMENT IN THE SEEDING-ROLLER OF A SEED-PLANTER.

Specification forming part of Letters Patent No. 7,642, dated September 10, 1850.

*To all whom it may concern:*

Be it known that I, AARON PALMER, of Brockport, in the county of Monroe and State of New York, have invented a new and Improved Seeding-Wheel for Planting-Machines; and I do hereby declare the following to be a full and exact description thereof, reference being had to the accompanying drawings, making a part of this specification, in which—

Figure 1 is a side elevation; Fig. 2, a sectional view in the direction indicated by the red lines in Figs. 3 and 4, and Figs. 3 and 4 are perspective views of the two principal component parts of the seeding-wheel detached.

Similar letters indicate like parts in all the figures.

My improved seeding-wheel for planting-machines is constructed by the union of the two parts which are represented in Figs. 3 and 4.

$d$ is a disk with a hole in its center, and having a series of segmental flanges, $e$, rising from its periphery, between which flanges are the openings $ff$, at one extremity of each of the flanges $e\ e$. They turn inward toward the center of the disk, as shown at $g\ g$, Fig. 3.

$a$ is a disk, having the flange $b$ projecting from its outer side, the lugs $c\ c$ radiating from its periphery, and the tube $i$ projecting from its center. The disk $a$ is received within the segmental flanges $e\ e$ rising from the disk $d$, and the tube $i$ passes through the hole in the center of $d$, as shown in Fig. 2. The depth of the disk $a$ corresponds with the height of the flanges $e\ g$, and the lugs $c\ c$, radiating from the periphery of $a$, extend outward to the inner surfaces of the flanges $e\ e$. The flange $b$, radiating from the outer side of $a$, bears upon the extremities of the segmental flanges $e\ e$, rising from $d$, and its periphery corresponds with the periphery of the said segmental flanges. When the parts $a$ and $d$ are thus placed together they are secured by the nut $h$, which works upon the screw cut upon the tube $i$.

The seeding-wheel thus constructed is placed upon the shaft of a planting-machine, within the grain or seed receptacle, in any usual or well-known manner, the shaft passing through the tube $i$.

$ff$ are openings to the planting-receptacles in the periphery of the seeding-wheel, the boundaries of which receptacles are formed by the inner surfaces of the segmental flanges $e\ e$, the outer periphery of $a$, the lugs $c\ c$, and the radial portions $g\ g$ of the segmental flanges; or, when very shallow planting-receptacles are required, they are bounded by the sides of the openings $ff$ and by the extremities of the lugs $c\ c$. It will therefore be perceived that by loosening the nut $h$ and turning the part $a$ within the inclosing part $d$, so as to bring the lugs $c\ c$ under the openings $ff$, or by turning the part $a$ in an opposite direction, so that the wings $c\ c$ will be carried toward the rear sides of $g\ g$, the planting-recesses can be made small and shallow enough for the smallest description of seeds or large and deep enough for any kinds of grain, or for depositing a larger or a smaller quantity of seeds at a time.

What I claim as my invention, and desire to secure by Letters Patent, is—

The constructing a seeding-wheel for a planting-machine by the combination of the two parts $a$ and $d$, of the form herein described, in such a manner that by turning one of the said parts within or upon the other in one direction the planting-receptacles will be reduced in depth and size, and by turning the said part of the seeding-wheel in an opposite direction the planting-receptacles will be enlarged in depth and size, substantially as here in set forth.

AARON PALMER.

Witnesses:
C. G. WILLIAMS,
C. W. PALMER.